UNITED STATES PATENT OFFICE.

MATTS FRED, OF HANCOCK, MICHIGAN.

WATER-PROOF PAINT.

SPECIFICATION forming part of Letters Patent No. 380,795, dated April 10, 1888.

Application filed December 8, 1887. Serial No. 257,285. (No specimens.)

*To all whom it may concern:*

Be it known that I, MATTS FRED, of Hancock, in the county of Houghton and State of Michigan, have invented a new Water-Proof Paint, of which the following is a full, clear, and exact description.

This invention consists in a new composition of matter to be used as a water-proof paint on iron, wood, and other materials, especially materials or surfaces exposed to water direct or dampness in the ground, including boats, ships' holds, the inside of water-tanks, fence-posts, railroad-ties, and wherever, without such protection, there is liability to rot, dampness, or rust.

My composition consists of the following ingredients combined in about the proportions stated, viz: charcoal, one quart; boiled linseed-oil, one and one-fourth quart; turpentine, one-fourth quart; litharge, one-half ounce; binoxide of manganese, one-half ounce.

The litharge and binoxide of manganese are first mixed as driers in the linseed-oil while boiling, and then the whole ground and mixed with the other ingredients to form the paint.

The charcoal in this composition will have the effect of preventing rot, and the oil have the effect of preventing the charcoal from washing off, and the whole is a protection against dampness and rust. Two coats of such paint on a dry surface will give a complete desired effect.

Where different or fancy colors are required, these are to be applied after the surfaces to be protected or adorned have been coated with my water-proof paint.

The proportions herein named of the ingredients may be more or less varied and other ingredients, if desired, be added.

Having thus described my invention, what I claim as new, and desire to secure by Letters Patent, is—

The herein-described composition of matter to be used as a water-proof paint, consisting of charcoal, boiled linseed-oil, turpentine, litharge, and binoxide of manganese, in or about the proportions specified.

MATTS FRED.

Witnesses:
A. CHRISTOPHER,
PETER ESCO.